United States Patent
Martinez-Barreiro et al.

(10) Patent No.: US 11,129,361 B2
(45) Date of Patent: Sep. 28, 2021

(54) SYSTEM AND METHOD FOR MANAGING LIVESTOCK USING RADIO FREQUENCY DEVICE

(71) Applicant: Tagacow LLC, Miami, FL (US)

(72) Inventors: Maria-Esther Martinez-Barreiro, Pinecrest, FL (US); Jorge Marin-Camba, Barcelona (ES); Francisco Vazquez, Barcelona (ES); Selva Via Labrada, Barcelona (ES); David Calero Scanlan, Cervello (ES); Jesus Alonso Zarate, Barcelona (ES); Fermin Elias Mira Perez, Sant Pere de Ribes (ES); Enric Fernandez Murcia, Barcelona (ES)

(73) Assignee: TAGACOW LLC, Miami, FL (US)

( * ) Notice: Subject to any disclaimer, the term of this patent is extended or adjusted under 35 U.S.C. 154(b) by 0 days.

(21) Appl. No.: 16/359,811

(22) Filed: Mar. 20, 2019

(65) Prior Publication Data

US 2019/0289821 A1    Sep. 26, 2019

Related U.S. Application Data

(60) Provisional application No. 62/645,904, filed on Mar. 21, 2018.

(51) Int. Cl.
*A01K 11/00* (2006.01)
*A01K 29/00* (2006.01)

(52) U.S. Cl.
CPC .......... *A01K 11/008* (2013.01); *A01K 11/004* (2013.01); *A01K 29/005* (2013.01)

(58) Field of Classification Search
CPC ... A01K 11/008; A01K 29/005; A01K 11/004
See application file for complete search history.

(56) References Cited

U.S. PATENT DOCUMENTS

| | | | |
|---|---|---|---|
| 4,854,328 A * | 8/1989 | Pollack | A61B 5/0008 600/549 |
| 6,720,879 B2 | 4/2004 | Edwards | |
| 8,836,501 B2 | 9/2014 | Song et al. | |
| 9,648,849 B1 * | 5/2017 | Vivathana | A01K 27/001 |
| 2008/0314325 A1 * | 12/2008 | Hempstead | A01K 11/004 119/51.02 |
| 2010/0218733 A1 * | 9/2010 | Jordan | A01G 25/16 119/720 |
| 2015/0351885 A1 * | 12/2015 | Kool | A61B 5/1118 600/551 |
| 2017/0202185 A1 * | 7/2017 | Trumbull | G16H 40/67 |
| 2017/0280687 A1 * | 10/2017 | Vrabete | G16H 40/63 |
| 2018/0328079 A1 * | 11/2018 | Lim | H04W 4/80 |

* cited by examiner

*Primary Examiner* — James J Yang
(74) *Attorney, Agent, or Firm* — Rabin & Berdo, P.C.

(57) ABSTRACT

A system can comprise a radio frequency (RF) monitoring device configured to collect information relating to livestock and transmit the collected information to a management device, and a management device configured to process the collected information and generate corresponding livestock management information.

18 Claims, 6 Drawing Sheets

SYSTEM AND METHOD FOR MANAGING LIVESTOCK USING RADIO FREQUENCY DEVICE

CROSS-REFERENCE TO RELATED APPLICATION

This application claims the benefit of the earlier filing date of provisional application 62/645,904, filed Mar. 21, 2018.

TECHNICAL FIELD

This application relates generally to an RF (radio frequency) monitoring device, and more specifically to a system and method for using the RF monitoring device to track and manage livestock.

BACKGROUND

Management of livestock faces significant challenges. For example, in the beef industry, a rancher must manage a herd of cows that are used to produce calves. The cows are bred to bulls so that, ideally, each cow produces a new calf each year. The calf crop that is produced each year is used primarily for meat production, with some calves retained as replacements for the herd. The calves are usually weaned from their mothers at between six and eight months of age. The traditional rancher will sell his/her animals once they are weaned.

Typically, the main objectives of the rancher are to have a calf from each cow each year; to have healthy, vigorous calves with the highest weaning weights at the lowest cost; and to produce the best meat, as determined by criteria such as tenderness and taste, at the lowest cost.

In order to support these objectives, the rancher is interested in efficient systems for identifying and tracking individual animals as they rotate through the pastures; identifying which animals have a good calving history; monitoring the performance of various pastures; evaluating the performance of calves from particular cows or bulls; and recording treatments, vaccinations, and other significant events that have occurred in the animal's life.

The management of other livestock, such as swine or sheep, has similar challenges.

SUMMARY

This application relates to a system and method for managing livestock using an RF monitoring device. The system can comprise a radio frequency (RF) monitoring device configured to collect information relating to livestock and transmit the collected information to a management device, and a management device configured to process the collected information and generate corresponding livestock management information. The collected information can include an identity of a livestock animal associated with the RF monitoring device.

The RF monitoring device can comprise at least one location device configured to detect a location of a livestock animal associated with the RF monitoring device. The RF monitoring device can further comprise at least one sensor configured to detect at least one of a state or behavior of a livestock animal associated with the RF monitoring device.

The method can comprise associating an RF monitoring device with a livestock animal, using the RF monitoring device to perform tracking of at least one of a state, a behavior or a location of the livestock animal, and based on the tracking, gathering information relating to the livestock animal, and providing the gathered information to a management device. The method can further comprise, by the management device, processing the gathered information and generating livestock management information based on the gathered information.

DETAILED DESCRIPTION

In various non-limiting embodiments, a system and method as described herein can facilitate data collection and processing for more efficient management of livestock. The system can comprise a radio frequency (RF) monitoring device configured to collect information relating to livestock and transmit the collected information to a management device, and a management device configured to process the collected information and generate corresponding livestock management information. The collected information can include an identity of a livestock animal associated with the RF monitoring device.

The RF monitoring device can comprise at least one location device configured to detect a location of a livestock animal associated with the RF monitoring device. The RF monitoring device can further comprise at least one sensor configured to detect at least one of a state or behavior of a livestock animal associated with the RF monitoring device.

The at least one state or behavior of the livestock animal can include any or all of a temperature of the livestock animal or a movement of the livestock animal. The location device can be configured to obtain Global Navigation Satellite System (GNSS) coordinates, which include Global Positioning System (GPS), Galileo and GLONASS coordinates, of the livestock animal.

The management device can include any device with computing and telecommunication capability. For example, the management device can include one or more servers in a network. Additionally or alternatively, the management device can include a base station or one or more components of a base station. The management device can be configured to generate a visual representation relating to livestock management based on processing the information collected by the RF monitoring device. The management device can be configured to generate an alert relating to livestock management based on processing the collected information.

The method can comprise associating an RF monitoring device with a livestock animal, using the RF monitoring device to perform tracking of at least one of a state, a behavior or a location of the livestock animal, and based on the tracking, gathering information relating to the livestock animal, and providing the gathered information to a management device. The method can further comprise, by the management device, processing the gathered information and generating livestock management information based on the gathered information. The generating the livestock management information can include generating a visual representation of at least one of the state, behavior or location of the livestock animal, and generating alerts relating to livestock management.

The performing tracking of the state of the livestock animal can include detecting a temperature of the livestock animal. The performing tracking of the behavior of the livestock animal can include detecting a movement of the livestock animal.

The method can further comprise changing a threshold for detecting the temperature of the livestock animal, and changing a frequency of detecting the temperature of the livestock animal. The method can further comprise changing a sensitivity of a test that determines whether to detect the movement of the livestock animal. The method can further comprise changing a frequency of, or intervals between, acquiring of the location of the livestock animal.

Figure 1A:
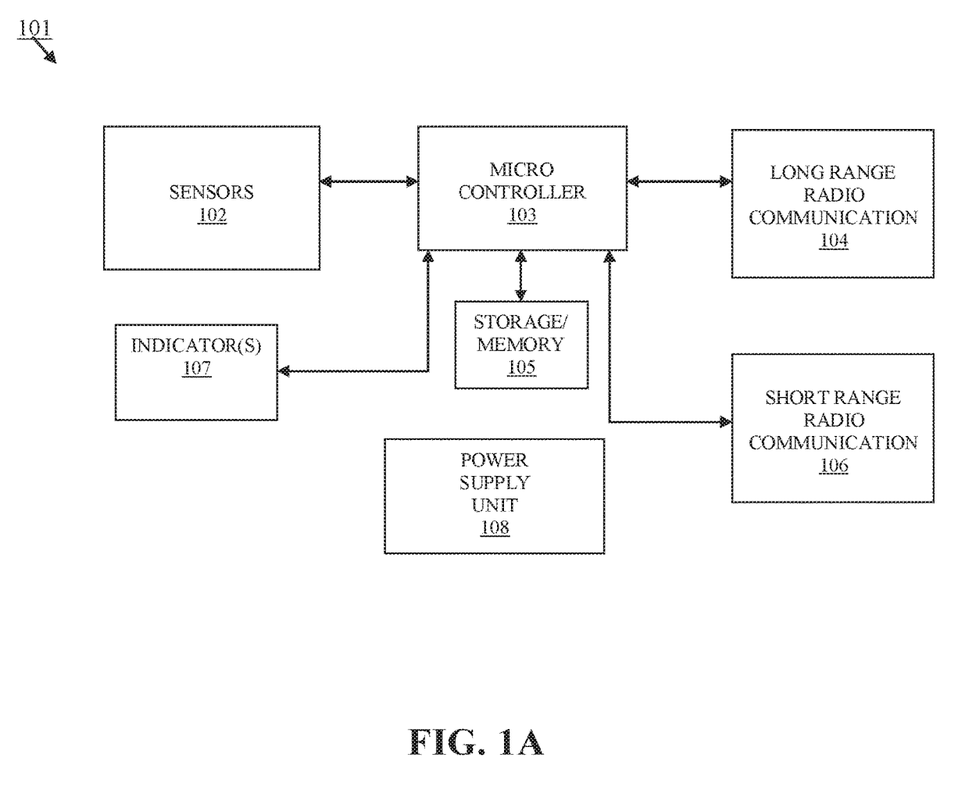
FIG. 1A shows an illustrative embodiment of an RF monitoring device.

FIG. 1A shows an illustrative embodiment of an RF monitoring device 101 according to the system and method described herein. The RF monitoring device 101 can include a microcontroller 103 coupled to sensors 102, long range radio communication 104 device, short range radio communication 104 device, storage/memory 105, and indicator(s) 107. The sensors 102 can include a Global Navigation Satellite System (GNSS) receiver module, a temperature sensor and an accelerometer. The accelerometer can be a 3-axis accelerometer. The long range radio communication device 104 can include a long range low power wide area (LPWA) network module, such as a SIGFOX™, LoRa or NB-IoT (narrowband Internet of Things) module. The short range radio communication 106 can include a Bluetooth™ low energy radio transceiver. The indicator(s) 107 can include one or more light-emitting diodes (LEDs). The power supply unit 108 can include a voltage regulator and a battery. The power supply unit 108 can further include, for example, an energy harvester such as a small solar panel.

Figure 1B:
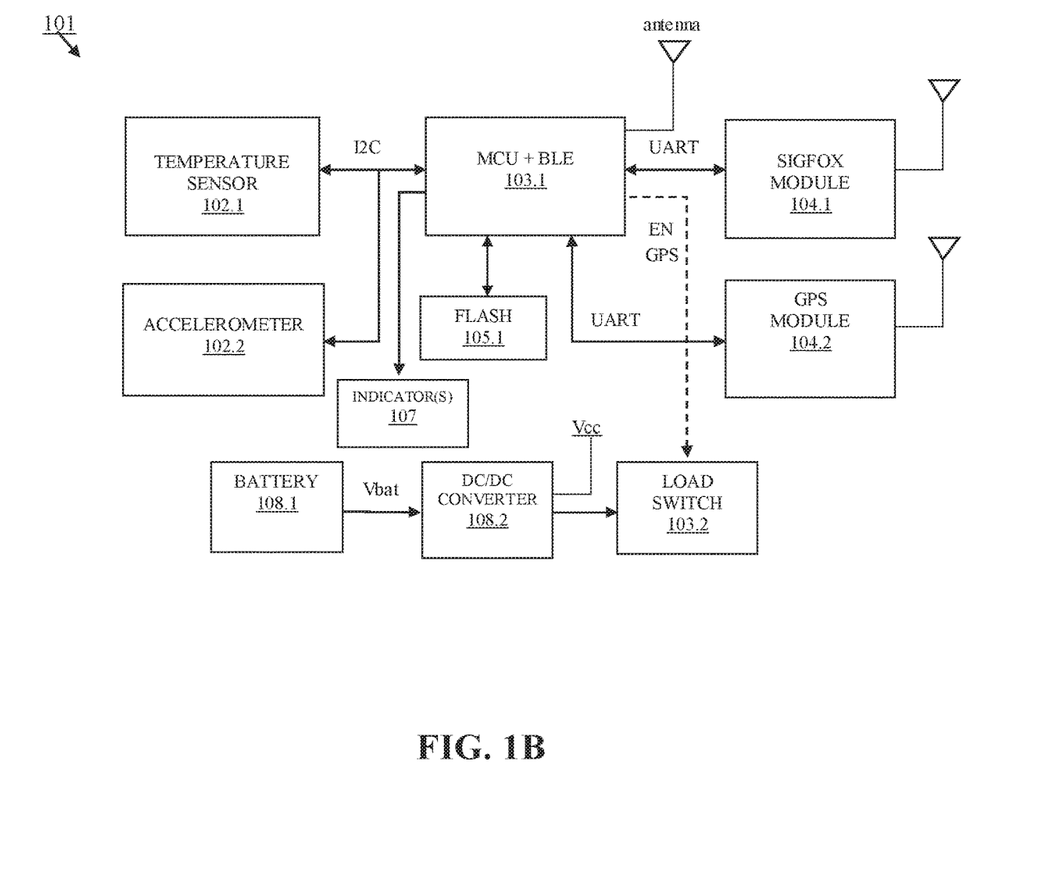
FIG. 1B shows another illustrative embodiment of the RF monitoring device.

FIG. 1B shows an embodiment corresponding to the RF monitoring device 101 of FIG. 1A, with greater specificity. In the embodiment illustrated in FIG. 1B, the RF signal device 101 can include a temperature sensor 102.1 coupled via an I2C connection to a microcontroller unit (MCU) and Bluetooth™ transceiver device (BLE) 103.1 having an antenna (note that in FIG. 1B, the microcontroller 103 and the short range radio communication 106 device are illustrated as being a single unit; however, this need not be the case, as shown in FIG. 1A). The temperature sensor 102.1 and the MCU and BLE 103.1 can further be coupled to an accelerometer 102.2. The MCU and BLE 103.1 can further be coupled via a universal asynchronous receive/transmit (UART) connection to a SIGFOX™ module 104.1 having an antenna.

The MCU and BLE 103.1 can further be coupled to a flash storage device 105.1, to a Global Positioning System (GPS) module 104.2 via a UART connection, to indicator(s) 107, and to a load switch 103.2. The MCU and BLE 103.1 can output an "enable GPS" (EN GPS) signal to the load switch 103.2.

Operating power can be supplied to the RF monitoring device 101 by a battery 108.1 that supplies a voltage Vbat to a DC/DC converter 108.2 coupled to the load switch 103.2. The battery 108.1 can be, for example, AA size: 50.5×14.7 mm, 19 gr. Total battery weight can be under 70 gr including IP 54 caging. Total battery size can be under 70×50×20 mm.

The RF monitoring device 101 can be configured to acquire coordinates of a livestock animal. To this end, the RF monitoring device 101 can be associated with the livestock animal, for example by attaching the RF monitoring device to the animal's ear, and the MCU and BLE 103.1 can be configured to perform operations to cause the SIGFOX™ module (or LoRa or NB-IOT module, for example, depending on the specific embodiment) 104.1 and the GPS module 104.2 to acquire Global Navigation Satellite System (GNSS) signals corresponding to the RF monitoring device 101 attached to the animal's ear. The RF monitoring device 101 can be configured so as to uniquely identify a particular animal. The MCU and BLE 103.1 can interpret the GNSS signals to determine the animal's location, expressed for example in terms of longitude and latitude coordinates, or other coordinates or information identifying the animal's location.

The RF monitoring device 101 can be configured to acquire the signals and compute the coordinates of a livestock animal at various predetermined times during a 24-hour cycle. For example, the MCU and BLE 103.1 can be configured to compute the animal's coordinates 4 times in 24 hours, at predetermined intervals such as every 6 hours. However, the RF monitoring device 101 is not limited in this respect and the GNSS information can be acquired and the coordinate information can be computed more frequently or less frequently, and at arbitrary intervals.

The MCU and BLE 103.1 can further be configured to instruct the temperature sensor 102.1 to measure and report the animal's temperature at predetermined, adjustable times and intervals. For example, if the animal's temperature is detected to be above a predefined threshold, the MCU and BLE 103.1 can instruct the temperature sensor 102.1 to report the animal's temperature with greater frequency, such once per hour. If the animal's temperature is later detected to be below the predefined threshold, the MCU and BLE 103.1 can instruct the temperature sensor 102.1 to report the animal's temperature with reduced frequency.

The accelerometer 102.2, which can be a 3-axis accelerometer as noted previously, can be configured to detect and report movements of the animal, under the control of the MCU portion of the MCU and BLE 103.1. For example, the accelerometer 102.2 can be configured to detect and report to the MCU whether the animal is moving or not. The accelerometer 102.2 can be configured to be in a low power mode for energy conservation, but to switch to an active mode that can use more energy, based on adjustable parameters. For example, the accelerometer 102.2 can be configured to switch from the low power mode to the active mode in response to movement by the animal of a predetermined strength or energy, and/or duration, or in response to movement at a particular time of day.

The RF monitoring device 101 can record the information received from the sensors 102, the long range radio communication 104 device, and the short range radio communication 106 device in various storage devices. For example, the information can be stored locally in the storage/memory 105, which can be a flash memory device 105.1 in various non-limiting embodiments. The information can also be stored remotely in a database separate from the RF monitoring device 101. For example, the microcontroller 103 can perform operations to cause the information to be uploaded, via the long range radio communications 104 device, to one or more databases maintained by server computers in the Internet or "cloud," or to a database in a base station.

The RF monitoring device 101 can be controlled remotely via the long range radio communications 104 device. For example, the RF monitoring device 101 can receive commands to adjust parameters of the RF monitoring device 101. By way of the parameters, operations of the RF monitoring device 101 can be fine-tuned. For example, commands can be received via the long range radio communication 104 device to adjust a sensitivity of a test that determines whether to detect movement of a livestock animal. For example, the adjustment can be to a pattern and sensitivity of a movement detection algorithm executed by the microcontroller 103 (or the MCU portion of the MCU and BLE 103.1) to control the accelerometer 102.2. The adjusting of the pattern and sensitivity can include, for example, increasing or decreasing the frequency of detecting movement by the animal, and/or increasing or decreasing a level of energy or strength of movement that triggers switching to the active mode and acquiring a new GPS position.

The RF monitoring device 101 can use the short range radio communication 106 device for various short range applications. For example, the RF monitoring device 101 can transmit BEACON packets through the MCU and BLE 103.1 to devices called "anchors." The anchors can be located in specific places in an installation (e.g. a ranch) that manages livestock. For example, the anchors can be located in specific places in fencing. An anchor can be configured to respond to each BEACON packet received with an ACK (acknowledgement response) packet, thereby, for example, confirming that the anchor is in place at a particular point and that the fencing is intact at that point.

Another application for the short range radio communication 106 device is communication with other "smart" mobile devices in the short range. For example, another smart mobile device (e.g., a smart phone, a tablet or handheld device) can transmit commands to the RF monitoring device 101 that are received via the short range radio communication 106 device. For example, via the Bluetooth™ transceiver of the MCU and BLE 103.1, a command can be received from another smart device requesting that the indicator(s) 107 display a status of the RF monitoring device 101. In response to the command, the MCU and BLE 103.1 can perform operations to cause the indicator(s) 107 to generate a corresponding display. For example, if the indicator(s) 107 include one or more LEDs, the one or more LEDs can be caused to start or stop blinking, thereby identifying a particular animal.

Figure 2A:
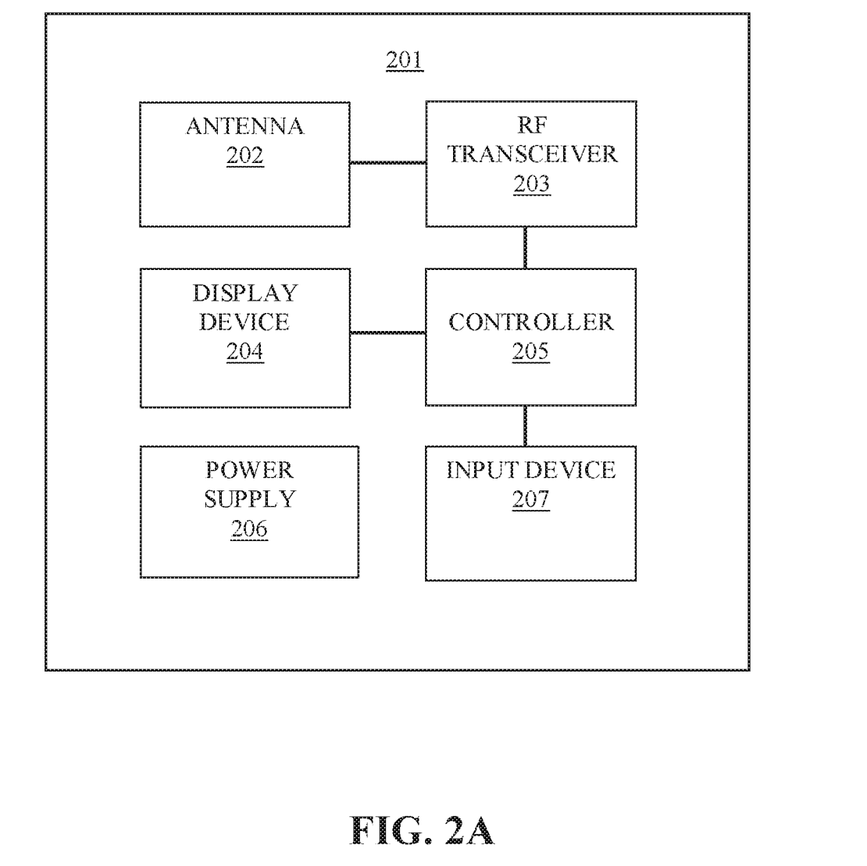
FIG. 2A shows an illustrative embodiment of a management device.

The RF monitoring device 101 can communicate with and receive control commands from a management device. FIG. 2A shows a functional block diagram of the management device 201. The management device 201 can be or include, for example, a base station or one or more components of a base station. Additionally or alternatively, the management device 201 can be or include a server (server computer) or servers in a network, such as the Internet or "cloud." However, the management device 201 is not limited in this respect and can be implemented in any sort of device configured with computing and telecommunication capabilities.

As shown in FIG. 2A, the management device 201 can include a communication device such as an RF transceiver 203 coupled to an antenna 202. The RF transceiver 203 and the antenna 202 can be configured to transmit and receive radio waves. The RF transceiver 203 and the display device 204 can be coupled to a controller 205. The controller 205 can be coupled to the input device 207 and be configured to perform operations in response to user input received by way of the input device 207. A power supply 206 of the management device 102 can provide power to the management device 201.

Figure 2B:
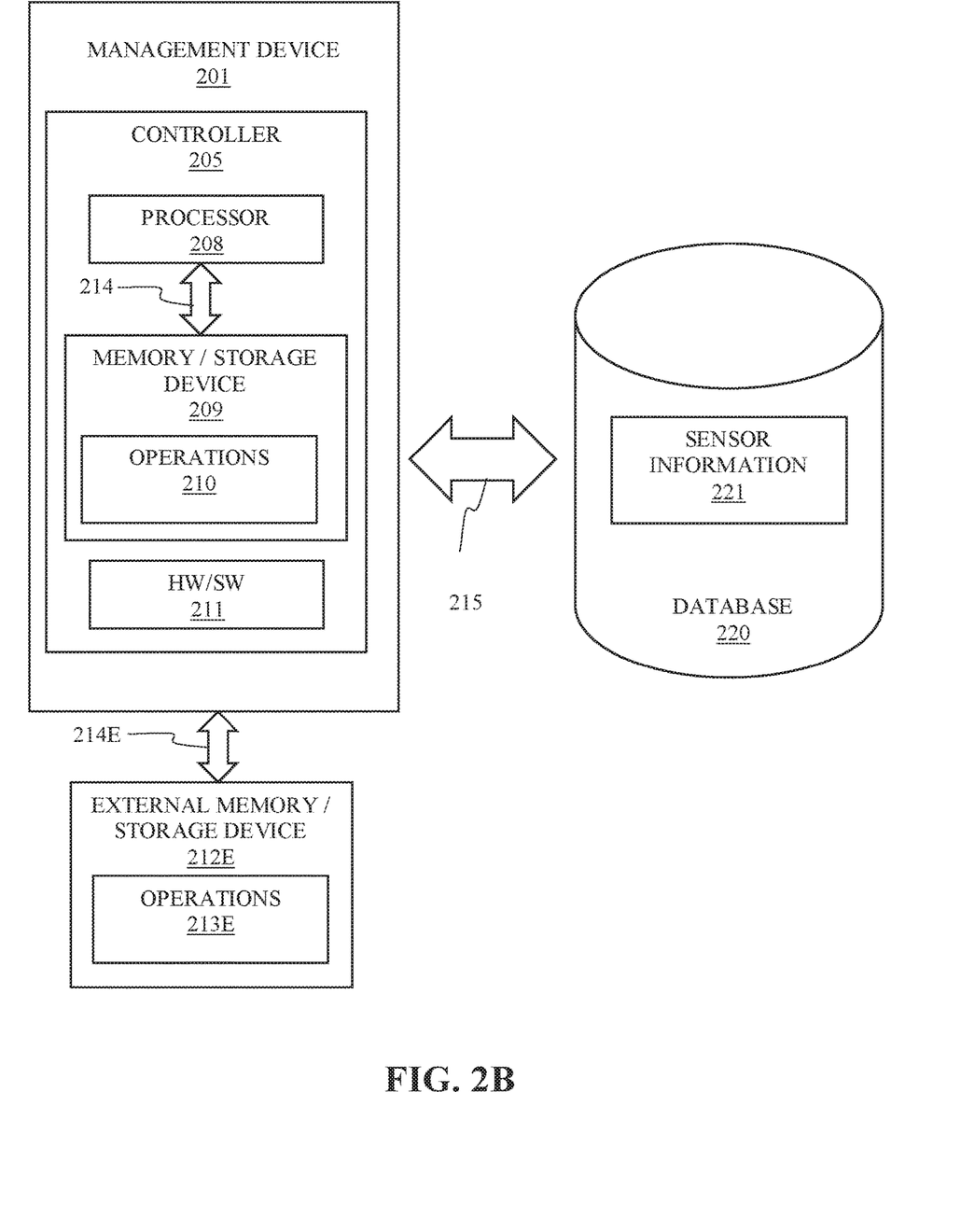
FIG. 2B shows another illustrative embodiment of the management device.

Referring to FIG. 2B, the controller 205 of the management device 201 can include a processor 208 and a memory or other electronic storage device 209. The memory/storage device 209 can store operations 210. The processor 208 can communicate via signals 214 with the memory/storage device 209 to perform the operations 210 to implement the methods and operations described herein. The processor 208 can include, for example, a general-purpose CPU (central processing unit) configured to fetch and execute instructions, corresponding to operations 210, stored in the memory 209 to implement the methods and operations. Additionally, or alternatively, the controller 205 can include any other hardware, firmware or software combinations 211 configured or configurable to carry out the methods and operations, such as one or more ASICs (application-specific integrated circuits) configured to carry out the methods and operations. In light of the foregoing, the term "processor" as used herein is intended to encompass standalone processors, as distinct from memory, as well as the combination of a processor and a memory, typically referred to as a computer, as well as any other hardware, firmware or software combinations configured or configurable to carry out the methods and operations described herein. The memory/storage device 209 can include any kind of machine-readable medium configurable to store information electronically, such as RAM (random access memory) or ROM (read-only memory). The management device 201 can communicate with a memory/storage device 209 internal to the management device 201 or the controller 205 but is not limited in this regard. The management device 201 can also communicate, for example, via signals 214E with an external memory/storage device 212E storing processor-executable operations 213E to carry out the methods and operations described herein. The memory/storage device 209 and the external memory/storage device 212E can include any kind of machine or non-transitory computer-readable media. Examples of machine/computer-readable storage media include, but are not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store information electronically and which can be accessed by a processor or computer.

The management device 201 can communicate with a database 220. The database 220 can be internal or external to the management device 201, but to simplify the drawing the database 220 is illustrated as being external to the management device 201 in FIG. 2B. The management device 201 can communicate with the database 220 by electronically exchanging signals 215 with the database 220. The database 220 can be a machine/computer-readable storage medium along the lines described previously. The database 220 can store sensor information 221. The sensor information 221 can include information collected by the sensors 102, long range radio communication 104 device and short range radio communication 106 device over a period of time concerning RF monitoring devices 101 and their associated livestock. In response to a request from the management device 201, the database 220 can provide the sensor information 221 to the management device 201. The management device 201 can process the information and generate corresponding livestock management information. Further, the management device 201 can write or update or otherwise record new or changed sensor information 221 to the database 220.

The management device 201 can communicate with the RF monitoring device 101 to control the RF monitoring device 101. For example, the management device 201 can transmit commands to the RF monitoring device 101 to change parameters that control operations of the RF monitoring device 101. Along lines discussed previously, the management device 201 can, based either on existing programming or based on new input by a user, transmit commands to the RF monitoring device 101 to change the frequency and/or interval at which an animal's location is computed; change the frequency at which the animal's temperature or other physical characteristic is detected or sensed; change a criterion for taking a sensor measurement by any of the sensors 102 (e.g., change the threshold temperature discussed previously) or for acquiring and computing a location by the long range radio communication 104 or the short range radio communication 106; change the pattern and/or sensitivity of the movement detection algorithm discussed previously; or otherwise update or modify software and/or firmware executed by any of the microcontroller 103, the sensors 102, the long range radio communication 104 device and the short range radio communication 106 device.

Figure 3:
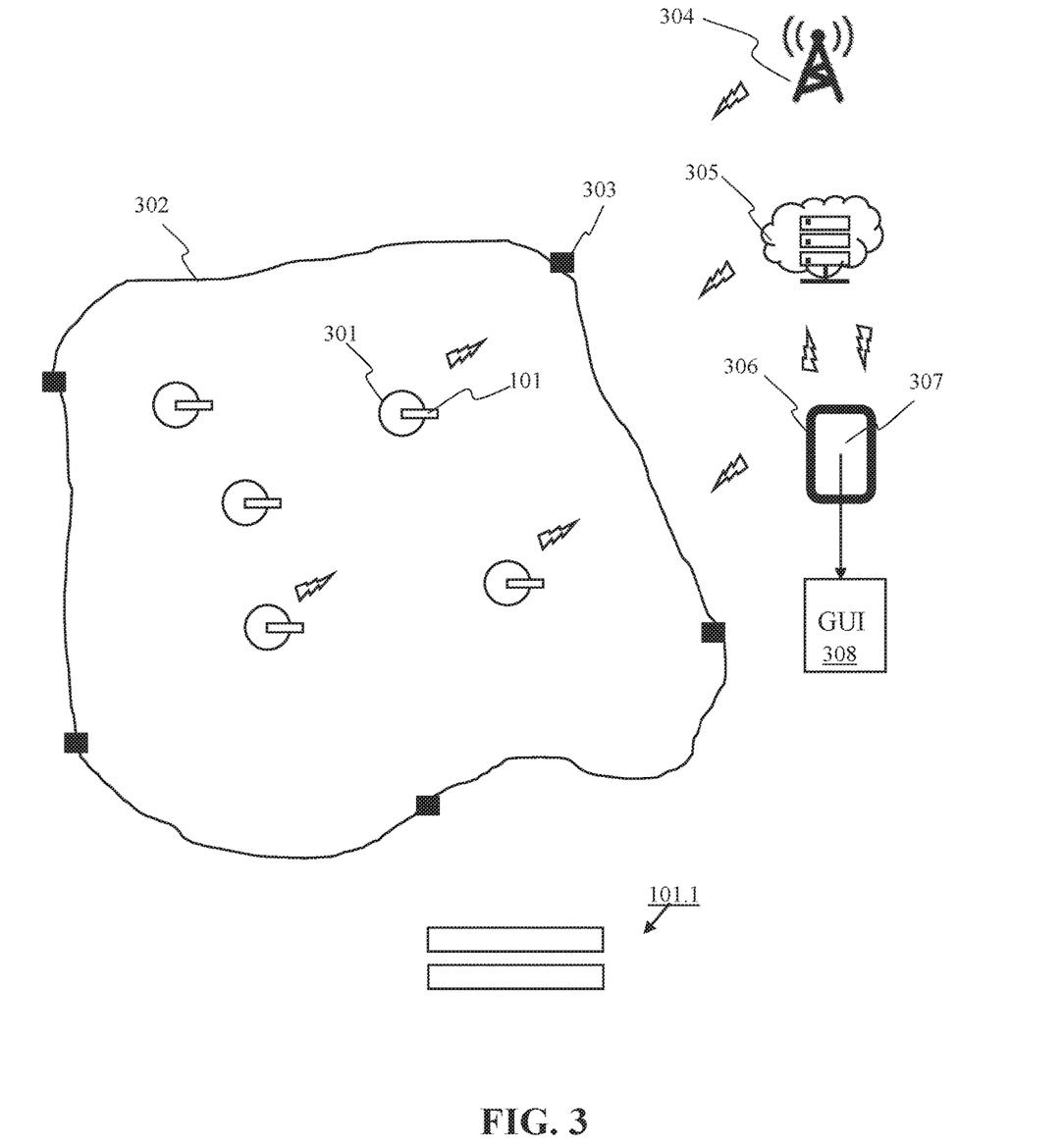
FIG. 3 illustrates an application of the system and method described herein.

FIG. 3 illustrates one non-limiting application of the system and method described herein. FIG. 3 shows a livestock management area 302, e.g., a fenced area equipped with anchors 303. Inside the livestock management area 302 are a plurality of livestock animals 301, each having an associated RF monitoring device 101. The RF monitoring devices 101 can track the livestock animals 301, collect information based on the tracking, and transmit the information (represented by the lightning bolt symbols) to any or all of a base station 304, a cloud server 305 or a reporting device 306.

The reporting device 306 can be or include a mobile computing and communication device, such as a smart phone, tablet or other handheld device. The reporting device 306 can include a display screen 307 that implements a graphical user interface 308. The reporting device 306 can transmit and receive information from the RF monitoring devices 101, the base station 304 and the cloud server 305. Based on the information received from any or all of the RF monitoring devices 101, the base station 304 or the cloud server 305, the reporting device 306 can implement a visual representation of the states, behaviors and locations of the livestock animals 301 in the GUI 308. For example, the visual representation can correspond to or be similar to the representation of the livestock management area 302 as shown in FIG. 3. The visual representation can further include alerts, such as alerts indicating that a livestock animal is ready for insemination or that a pregnant livestock animal is ready to deliver. Alerts can further indicate that a livestock animal is lost, or sick and requiring attention from a veterinarian.

FIG. 3 further shows an enclosure or case 101.1 of the RF monitoring device 101. The case 101.1 can be lightweight and compact, and comprise two parts suitable for being easily separated and rejoined to facilitate replacement of parts. The case 101.1 can include an attachment device for attaching the RF monitoring device 101 to a livestock animal's ear.

Figure 4:
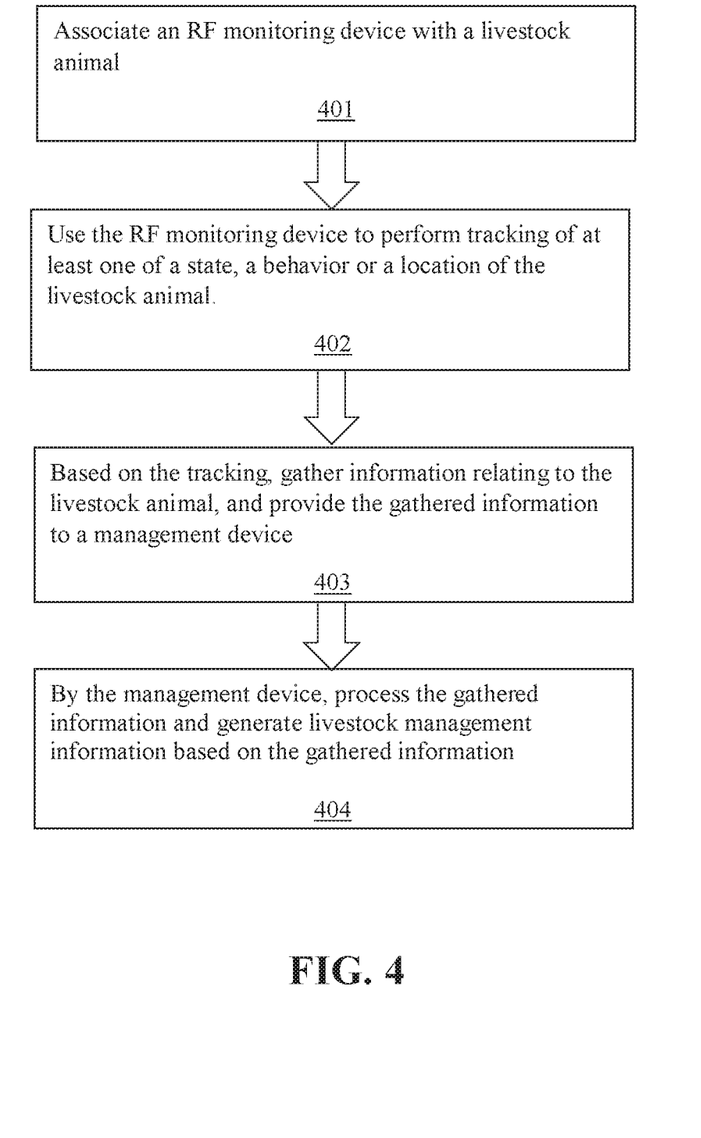
FIG. 4 is a flowchart showing a method for managing livestock using the RF monitoring device and the management device.

FIG. 4 shows a flowchart of the method for managing livestock using the RF monitoring device 101 described herein. As shown in block 401, the method can comprise associating an RF monitoring device with a livestock animal. As shown in block 402, the method can further comprise using the RF monitoring device to perform tracking of at least one of a state, a behavior or a location of the livestock animal. As shown in block 403, the method can further comprise, based on the tracking, gathering information relating to the livestock animal, and providing the gathered information to a management device. As shown in block 404, the method can further comprise, by the management device, processing the gathered information and generating livestock management information based on the gathered information.

In light of the foregoing, the system and method described herein offers significant advantages over existing approaches.

Referring to the example of the cattle industry (noting that the system and method is not limited to the cattle industry but can also be used in other livestock applications), free range cattle farmers face major challenges: animal welfare on a substantial amount of rangeland is difficult and expensive to manage; a majority of small to medium farms of an aging population lack traditional family support; there is a high risk of loss due to illness, theft and at delivery; there are costs due to cattle being out of boundaries; and there is price pressure and lack of consumer differentiation in quality products.

Using the system and method described herein to improve data collection, interpretation and delivery, the above-described problems can be ameliorated. It is estimated that with the system and method, an early disease diagnostic as well as more precise knowledge of when a cow is ready for delivery can be provided, in order to provide proper assistance, leading to lower calf and cow mortality. In addition, by shortening calving intervals using the system and method, a significant percentage increase in annual production can be expected. Further, knowing promptly when a cow is outside a safe perimeter, as is possible with the anchor system described herein, can prevent further losses as well as theft.

Often ranchers complain they lack time during the day to accomplish all their duties. By facilitating herd management with the system and method, daily hours can be dedicated to maximize ranch economics on other activities or increasing the size of the herd, etc., and reducing paperwork. Moreover, livestock animals will have a wellness electronic file (corresponding, e.g., to the sensor information 221 discussed previously) about their lives in the farm for quality assurance certifications (BQA, AENOR, etc.) to differentiate in the market, allowing for higher selling prices to a more conscious consumer.

Still further, existing approaches to livestock management have used large, cumbersome tracking devices, such as heavy collars, that are often expensive and have limited battery life. In contrast, the system described herein offers a small, lightweight ear tag form factor with several years of battery life.

It will be understood that the foregoing description is provided for illustration only, and not for limitation of the appended claims and their equivalents. It will further be understood that the above-described exemplary embodiments are susceptible to various modifications, changes and adaptations, and the same are intended to be comprehended within the meaning and range of equivalents of the appended claims.

What is claimed is:

1. A system, comprising:
    a radio frequency (RF) monitoring device configured to
        collect information relating to livestock, and
        transmit the collected information to a management device;

wherein the RF monitoring device is attachable to a livestock animal and includes a case containing
a controller,
a long-range communication device coupled to the controller, and
a short-range communication device coupled to the controller;
wherein
the collected information includes an identity of the livestock animal; and
the long-range communication device comprises at least one of a long-range low-power wide-area (LPWA) SIGFOX™ module, LoRa or NB-IOT module, and further comprises a GPS module configured to acquire Global Navigation Satellite System (GNSS) signals corresponding to an RF monitoring device attached to the livestock animal; and
wherein the long-range communication device is configured to receive commands remotely to adjust parameters of the RF monitoring device, the commands including commands for
changing at least one of a frequency or interval at which the livestock animal's location is computed,
changing a criterion for taking a sensor measurement by any of a plurality of sensors included in the RF monitoring device and coupled to the controller,
changing a criterion for acquiring and computing a location of the livestock animal by the long-range communication device or the short-range communication device,
changing at least one of a pattern or sensitivity of a movement detection algorithm executed by the controller for analyzing a behavior of the livestock animal, and
modifying at least one of software or firmware executed by any of the controller, the plurality of sensors, the long-range communication device and the short-range communication device.

2. The system of claim 1, further comprising the management device, the management device being configured to process the collected information and generate corresponding livestock management information;
wherein the information includes geographical coordinates, temperature, and acceleration in three axes of the livestock animal.

3. The system of claim 1, wherein the plurality of sensors include
a temperature sensor and a 3-axis accelerometer,
the temperature sensor being configured to, under control of the controller, measure and report the livestock animal's temperature at predetermined, adjustable times and intervals, and
the 3-axis accelerometer being configured to, under control of the controller, detect and report movements of the livestock animal.

4. The system of claim 1, wherein:
the short-range communication device is configured to receive commands for controlling operations of another device coupled to the controller.

5. The system of claim 1, wherein the changing of the at least one of the pattern or sensitivity of the movement detection algorithm executed by the controller for analyzing a behavior of the livestock animal includes increasing or decreasing a frequency of detecting and reporting to the controller whether or not the livestock animal is moving,
wherein the accelerometer is further configured to operate in both a low power mode for energy conservation and an active mode that uses more energy than the low power mode, and to switch from the low power mode to the active mode in response to movement by the livestock animal of at least one of a predetermined strength, energy or duration, or in response to movement at a particular time of day, and
wherein the movement detection algorithm executed by the controller increases or decreases a level of the predetermined strength or energy of the movement of the livestock animal that triggers switching from the low power mode of the accelerometer to the active mode of the accelerometer.

6. The system of claim 5, wherein the changing the criterion for taking the sensor measurement by any of the plurality of sensors includes, by the controller, increasing a frequency of reporting the livestock animal's temperature by a temperature sensor coupled to the controller, based on detecting the livestock animal's temperature to be above a predefined threshold, and decreasing the frequency of reporting the livestock animal's temperature by the temperature sensor coupled to the controller, based on detecting the livestock animal's temperature to be below the predefined threshold.

7. The system of claim 2, wherein the management device includes one or more servers in a network.

8. The system of claim 2, wherein the management device includes one or more components of a base station.

9. The system of claim 6, wherein the changing the criterion for acquiring and computing the location of the livestock animal includes increasing or decreasing an interval at which GNSS coordinates of the livestock animal are acquired and the livestock animal's location is computed.

10. The system of claim 9, wherein the short-range communication device is configured to perform operations including:
in response to a command received from a mobile device, cause an indicator of the RF monitoring device to generate a corresponding display, and
communicate with a fixed anchor device of a livestock animal containment installation.

11. A method, comprising:
attaching an RF monitoring device to a livestock animal;
using the RF monitoring device to perform tracking of at least one of a state, a behavior or a location of the livestock animal;
based on the tracking, gathering information relating to the livestock animal; and
providing the gathered information to a management device;
wherein the using the RF monitoring device to perform the tracking includes using a long-range communication device and a short-range communication device included in the RF monitoring device to perform the tracking; and
wherein the using the long-range communication device includes receiving remotely, by the long-range communication device, commands for
changing at least one of a frequency or interval at which the livestock animal's location is computed,
changing a criterion for taking a sensor measurement by any of a plurality of sensors included in the RF monitoring device and coupled to a controller of the RF monitoring device,
changing a criterion for acquiring and computing a location of the livestock animal by the long-range communication device or the short-range communication device, changing at least one of a pattern or sensitivity of a movement detection algorithm executed by the controller for analyzing a behavior of the livestock animal, and modifying at least one of software or firmware executed by any of the controller, the plurality of sensors, the long-range communication device and the short-range communication device.

12. The method of claim 11, further comprising:
by the management device, processing the gathered information and generating livestock management information based on the gathered information,
the gathered information including geographical coordinates, temperature and acceleration in three axes of the livestock animal.

13. The method of claim 11, wherein the changing of the at least one of the pattern or sensitivity of the movement detection algorithm executed by the controller for analyzing a behavior of the livestock animal includes increasing or decreasing a frequency of detecting and reporting to the controller whether or not the livestock animal is moving,
wherein the accelerometer is further configured to operate in both a low power mode for energy conservation and an active mode that uses more energy than the low power mode, and to switch from the low power mode to the active mode in response to movement by the livestock animal of at least one of a predetermined strength, energy or duration, or in response to movement at a particular time of day, and
wherein the movement detection algorithm executed by the controller increases or decreases a level of the predetermined strength or energy of the movement of the livestock animal that triggers switching from the low power mode of the accelerometer to the active mode of the accelerometer.

14. The method of claim 13, wherein the changing the criterion for taking the sensor measurement by any of the plurality of sensors includes, by the controller, increasing a frequency of reporting the livestock animal's temperature by a temperature sensor coupled to the controller, based on detecting the livestock animal's temperature to be above a predefined threshold, and decreasing the frequency of reporting the livestock animal's temperature by the temperature sensor coupled to the controller, based on detecting the livestock animal's temperature to be below the predefined threshold.

15. The method of claim 14, wherein the changing the criterion for acquiring and computing the location of the livestock animal includes increasing or decreasing an interval at which GNSS coordinates of the livestock animal are acquired and the livestock animal's location is computed.

16. The method of claim 13, wherein the using the short-range communication device includes:
in response to a command received from a mobile device, causing an indicator of the RF monitoring device to generate a corresponding display, and
communicating with a fixed anchor device of a livestock animal containment installation.

17. The method of claim 11, wherein the generating the livestock management information includes generating a visual representation of at least one of the state, the behavior or the location of the livestock animal.

18. The system of claim 1, wherein the case further contains:
a temperature sensor coupled to the processor;
an accelerometer coupled to the processor;
a flash memory coupled to the processor; and
an indicator coupled to the processor; wherein
the long-range communication device includes a long-range low power wide area (LPWA) network module; and
the short-range communication device includes a low-energy radio transceiver.

* * * * *